United States Patent
Kozu

[19]

[11] Patent Number: 5,892,696
[45] Date of Patent: Apr. 6, 1999

[54] PIPELINE CONTROLLED MICROPROCESSOR

[75] Inventor: Shin-Ichi Kozu, Tokyo, Japan

[73] Assignee: NEC Corporation, Tokyo, Japan

[21] Appl. No.: 626,002

[22] Filed: Apr. 1, 1996

[30] Foreign Application Priority Data

Mar. 31, 1995 [JP] Japan ..................... 7-075136

[51] Int. Cl.[6] ........................................ G06F 7/38
[52] U.S. Cl. ....................... 364/736.01; 364/736.02
[58] Field of Search ..................... 364/736.01, 736.05

[56] References Cited

U.S. PATENT DOCUMENTS

| | | | |
|---|---|---|---|
| 4,771,379 | 9/1988 | Ando et al. | 364/736.02 |
| 4,852,040 | 7/1989 | Oota | 364/736.03 |
| 4,945,506 | 7/1990 | Baji | 364/736.03 |
| 4,949,292 | 8/1990 | Hoshino et al. | 364/736.03 |

FOREIGN PATENT DOCUMENTS

| | | |
|---|---|---|
| 57-90755 | 6/1982 | Japan . |
| 60-24657 | 2/1985 | Japan . |
| 63-180146 | 7/1988 | Japan . |
| 3-202934 | 9/1991 | Japan . |
| 4-215185 | 8/1992 | Japan . |
| 5-88893 | 4/1993 | Japan . |

*Primary Examiner*—Tan V. Mai
*Attorney, Agent, or Firm*—Foley & Lardner

[57] ABSTRACT

A microprocessor by a pipeline control method with the process of a machine instruction divided into several stages for performing the parallel processing in each stage comprises a register file for holding the data necessary for the internal arithmetic processing and providing an arithmetic circuit with the data, a plurality of timing registers for temporally holding the parallel processed data in each stage, and a short pass circuit connected between the output of the arithmetic circuit as well as the timing registers of holding the operation result by the arithmetic circuit and the timing registers of holding the input data for the arithmetic circuit, the short pass circuit selecting operands the register file can't provide with at a time from the output of the arithmetic circuit or from the output of the timing register of holding the operation result by the arithmetic circuit and simultaneously providing the timing registers of holding the input data for the arithmetic circuit with the data of the operands.

8 Claims, 8 Drawing Sheets

Opcode bit 12..10

| bit 15..13 | 0 | 1 | 2 | 3 | 4 | 5 | 6 | 7 | Format |
|---|---|---|---|---|---|---|---|---|---|
| 0 | mov | add | sub | cmp | shl | shr | jmp | sar | I |
| 1 | mul | div | mulu | divu | or | and | xor | not | |
| 2 | mov | add | setf | cmp | shl | shr | ei | sar | II / |
| 3 | trap | reti | halt | | ldsr | stsr | di | (◇ Bstr) | II |
| | | brkret | stby | | | | | | IX |
| 4 | | | | | | | | | III |
| 5 | movea | addi | jr | jal | ori | andi | xori | movhi | IV / V |
| 6 | ld.b | ld.h | muli | ld.w | st.b | st.h | maci | st.w | VI |
| 7 | in.b | in.h | caxi | in.w | out.b | out.h | Special | out.w | VI / VII / VIII |

Bcond / ABcond bit 11..9

Branch on Condition (Bcond / ABcond)

| bit 13 | 0 | 1 | 2 | 3 | 4 | 5 | 6 | 7 |
|---|---|---|---|---|---|---|---|---|
| 0 | bv | bc/bl | bz/be | bnh | bn | br | blt | ble |
| 1 | bnv | bnc/bnl | bnz/bne | bh | bp | nop | bge | bgt |

Special (Fpp)

bit 28..26

| bit 31..29 | 0 | 1 | 2 | 3 | 4 | 5 | 6 | 7 |
|---|---|---|---|---|---|---|---|---|
| 0 | (◇ compf.s) | | (◇ cvt.ws) | (◇ cvt.ws) | (◇ addf.s) | (◇ subf.s) | (◇ mulf.s) | (◇ divf.s) |
| 1 | | satadd3 | satsub3 | min3 | max3 | | | |
| 2 | | | | | (◇ trnc.ws) | | | |
| 3 | | shld3 | shrd3 | | mact3 | mac3 | mult3 | mul3 |
| 4 | | bild | bdld | bist | bdst | | | |
| 5 | | | | | | | | |
| 6 | | | | | | | | |
| 7 | | | | | | | | |

PIPELINE STAGE

| IF | ADD | MAC3 | ADD |      |      |      |
|----|-----|------|-----|------|------|------|
| RF |     | ADD  | MAC3| ADD  |      |      |
| EX |     |      | ADD | MAC3 | ADD  |      |
| DF |     |      |     | ADD  | MAC3 | ADD  |
| WB |     |      |     |      | ADD  | MAC3 | ADD |

→ TIME

FIG. 5

PIPELINE STAGE

| IF | XOR | SHLD3 | ADD |       |       |     |
|----|-----|-------|-----|-------|-------|-----|
| RF |     | XOR   | SHLD3 | ADD |       |     |
| EX |     |       | XOR | SHLD3 | ADD   |     |
| DF |     |       |     | XOR   | SHLD3 | ADD |
| WB |     |       |     |       | XOR   | SHLD3 | ADD |

→ TIME

| PIPELINE STAGE | | | | | | | | | |
|---|---|---|---|---|---|---|---|---|---|
| IF | XOR | SHLD3 | ADD | ADD | | | | | |
| RF | | XOR | SHLD3 | SHLD3 | ADD | | | | |
| EX | | | XOR | | SHLD3 | ADD | | | |
| DF | | | | XOR | | SHLD3 | ADD | | |
| WB | | | | | XOR | | SHLD3 | ADD | |

→ TIME

KILL
HOLD

– 1 –

PIPELINE CONTROLLED MICROPROCESSOR

BACKGROUNDS OF THE INVENTION

1. Field of the Invention

The present invention relates to a microprocessor, and more particularly to a pipeline controlled microprocessor.

2. Description of the Related Art

Figure 6:
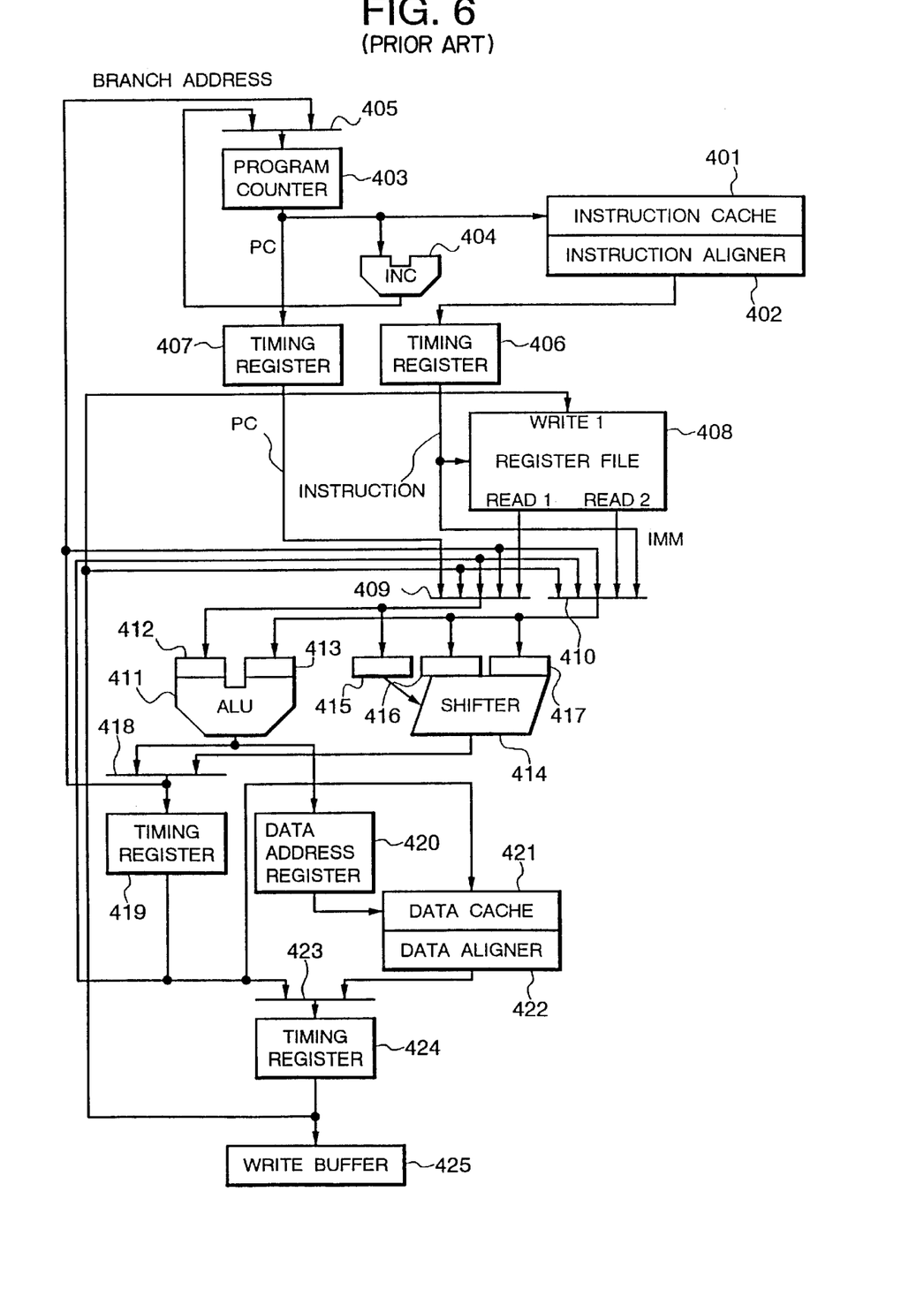
FIG. 6 is a block diagram showing a constitution of a conventional pipeline controlled microprocessor as a first example.

This kind of a conventional pipeline controlled microprocessor has been used in order to improve the throughput for a machine instruction during a given period. For example, FIG. 6 is a block diagram showing a first example of the conventional pipeline controlled microprocessor.

The conventional pipeline controlled microprocessor of the first example comprises a register file 408 having two read ports and holding the data necessary for the internal arithmetic processing of a machine instruction, an ALU 411 and a shifter 414 constituting an arithmetic circuit for performing an arithmetic and logic operation by the use of the data held in the register file 408, a plurality of timing registers 406, 407, 412, 413, 415, 416, 417, 419 and 424 for holding the parallel processed data in the respective stages into which the process of the machine instruction is divided.

The microprocessor further comprises an instruction cache 401, an instruction aligner 402, a program counter 403, an incremental counter 404, an address selector 405, bypass selectors 409 and 410, arithmetic output selectors 418 and 423, a data address register 420, a data cache 421, a data aligner 422 and a write buffer 425.

The microprocessor of the first example divides the process of a machine instruction into the following five stages; IF (Instruction Fetch), RF (Register Fetch), EX (Execute), DF (Data Fetch) and WB (Write Back), and parallely processes the movement as follows in the respective stages.

In the stage of IF, the microprocessor reads a machine instruction from the instruction cache 401 through the instruction aligner 402, and holds the data in the timing register 406.

In the stage of RF, the microprocessor decodes the machine instruction read out therefrom, decides the type of the operation, reads out the data within the register operand-designated by the instruction from the register file 408, and holds the data in the timing registers 412 and 413, or the timing registers from 415 to 417.

In the stage of EX, the microprocessor executes the operation decided by the machine instruction by the use of the read data within the register, and holds the result in the timing register 419 or writes the operation result into the program counter 403 as an address, thereby performing an instruction branch.

In the stage of DF, the microprocessor writes the data within the register file 408 into the data cache 421 by the use of the operation result, reads out the data within the data cache 421 and holds the data in the timing register 424, or holds the operation result held in the timing register 419, in the other timing register.

In the stage of WB, the microprocessor writes into the register file 408 the data read out from the data cache 421 or the data within the timing register 424 holding the operation result.

The case of executing the following machine instruction string will be explained as a concrete example.

| xor | r1, | r4 | | ; exclusive OR |
|---|---|---|---|---|
| shld3 | r2, | r3, | r4 | ; connection and left shift |
| add | r6, | r7 | | ; addition |

The first instruction 'xor' is an instruction so as to execute the exclusive OR operation for a first operand and a second operand and store the result into the second operand. The second instruction 'shld3' is an instruction of three operands so as to connect the second operand and a third operand, shift it to the left for the shift number designated by the lower five bits of the first operand, and store the resultant upper 32 bits into the third operand. The third instruction 'add' is an instruction so as to execute the addition of the first operand and the second operand and store the result into the second operand.

Figure 9:
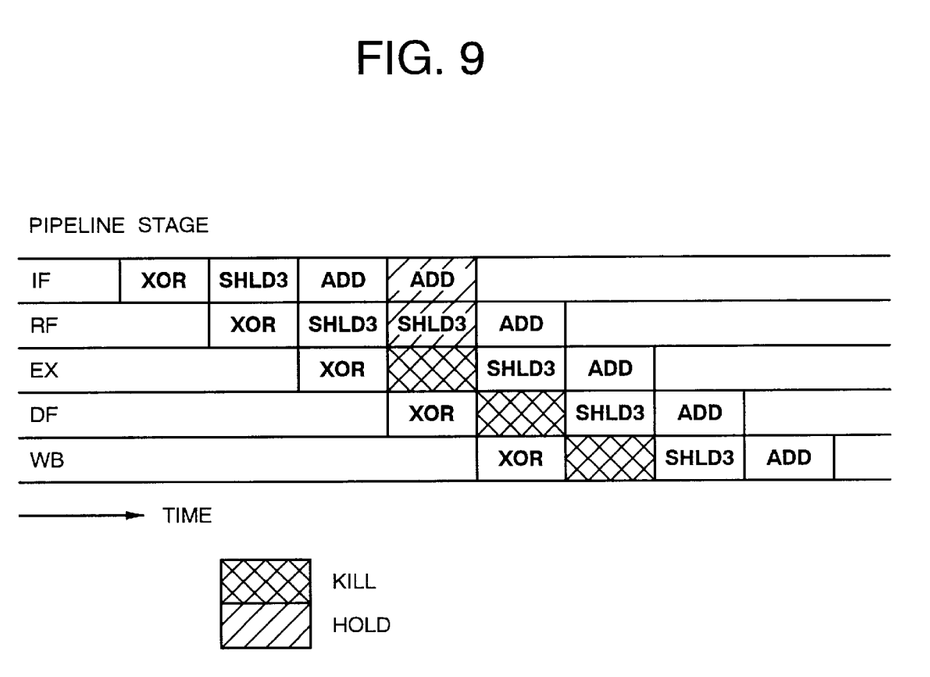
FIG. 9 is a timing chart showing the movement of the conventional pipeline controlled microprocessor of the first example in executing the machine instruction string.

FIG. 9 is a timing chart showing the movement of the microprocessor executing the machine instruction string described above.

At first, the microprocessor reads the first instruction 'xor' from the instruction cache 401 through the instruction aligner 402, and holds the data in the timing register 406.

In the next cycle, the microprocessor decodes the first instruction 'xor' read out therefrom, reads out the data within the register r1 and the register r4 designated as the first operand and the second operand by the instruction from the register file 408, and holds each data in the respective timing registers 412 and 413 providing the ALU 411 with the data through the respective bypass selectors 409 and 410. Simultaneously, the microprocessor reads the second instruction 'shld3' and holds the data in the timing register 406.

In the next cycle, the microprocessor executes the exclusive OR operation of the first instruction 'xor' by means of the ALU 411 and holds the operation result in the timing register 419. Simultaneously, it decodes the second instruction 'shld3', reads out the data within the register r2 and the register r3 designated as the first operand and the second operand by the instruction from the register file 408, and holds each data in the respective timing registers 415 and 416 providing the shifter 414 with the data through the respective bypass selectors 409 and 410.

However, the third operand designated by the instruction 'shld3' is not prepared in this cycle because of only two sets of read ports in the register file 408 and bypass selectors provided there. Accordingly, shift operation can't be performed in the next cycle, so that the third instruction 'add' read into the timing register 406 won't be performed in the next cycle.

In the next cycle, the operation result of the first instruction 'xor' held in the timing register 419 for adjusting the timing to write the data into the register r4 is further held in the other timing register 424 as well as in the timing register 417 providing the shifter 414 with the third input data. The third instruction 'add' read into the timing register 406 is reserved in this cycle.

In the next cycle, the operation result of the first instruction 'xor' held in the timing register 424 is written into the register r4 of the register file 408. The microprocessor executes the operation of the second instruction 'shld3' and holds the operation result in the timing register 419. It further decodes the third instruction 'add', reads out the data within the registers r6 and r7 designated as the first operand and the second operand by the instruction from the register file 408, and holds each data in the respective timing registers 412 and 413 providing the ALU 411 with the data.

Figure 7:
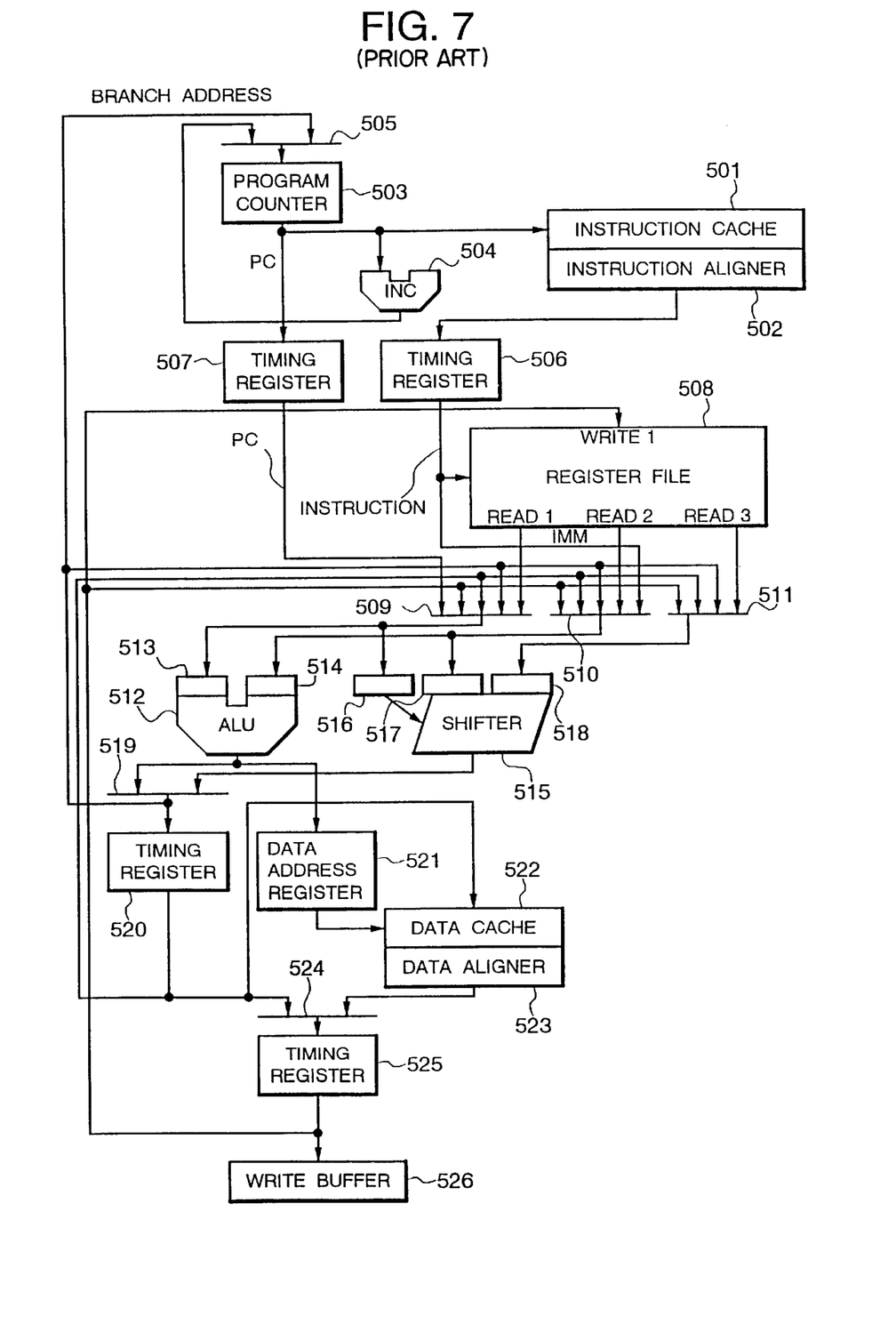
FIG. 7 is a block diagram showing a constitution of a conventional pipeline controlled 32 bits microprocessor as a second example.

As illustrated in FIG. 9, delay for one cycle in the instruction operation occurs in the pipeline controlled process of the machine instruction string in the respective cycles, because of the incapacity to prepare the third operand at the same time as the other operands when executing the connection and left shift operation explained as the second instruction 'shld3', which is called a structure hazard. The presence of time slot killed by the structure hazard is shown in FIG. 7. Such structure hazard similarly occurs in the instructions requiring three input operands like the instruction 'shld3'.

FIG. 7 is a block diagram showing a second example of the conventional pipeline controlled 32 bits microprocessor.

The conventional pipeline controlled microprocessor of the second example comprises a register file 508 having three read ports and holding the data necessary for the internal arithmetic processing of a machine instruction, an ALU 512 and a shifter 515 constituting an arithmetic circuit for performing an arithmetic and logic operation by the use of the data held in the register file 508, a plurality of timing registers 506, 507, 513, 514, 516, 517, 518, 520 and 525 for holding the parallel processed data in the respective stages into which the operation process of the machine instruction is divided, and a bypass selector 511 for selecting the data to be held in the timing register 518.

Other blocks are the same as those of the conventional microprocessor of the first example shown in FIG. 6, and hence the explanation thereof is omitted.

When the conventional microprocessor of the second example similarly executes the machine instruction string which has been used for explaining the movement of the conventional microprocessor of the first example, such a structure hazard that occurs in executing the instruction 'shld3' by the conventional microprocessor of the first example doesn't occur in the second example. This is why the register file 508 has three read ports capable of simultaneously providing the shifter 515 with three operands necessary for the internal arithmetic processing of the instruction 'shld3'.

The register file 508 having three read ports, however, requires a chip area about one and a half times larger than the register file 408 having two read ports indicated in FIG. 6.

Figure 8:
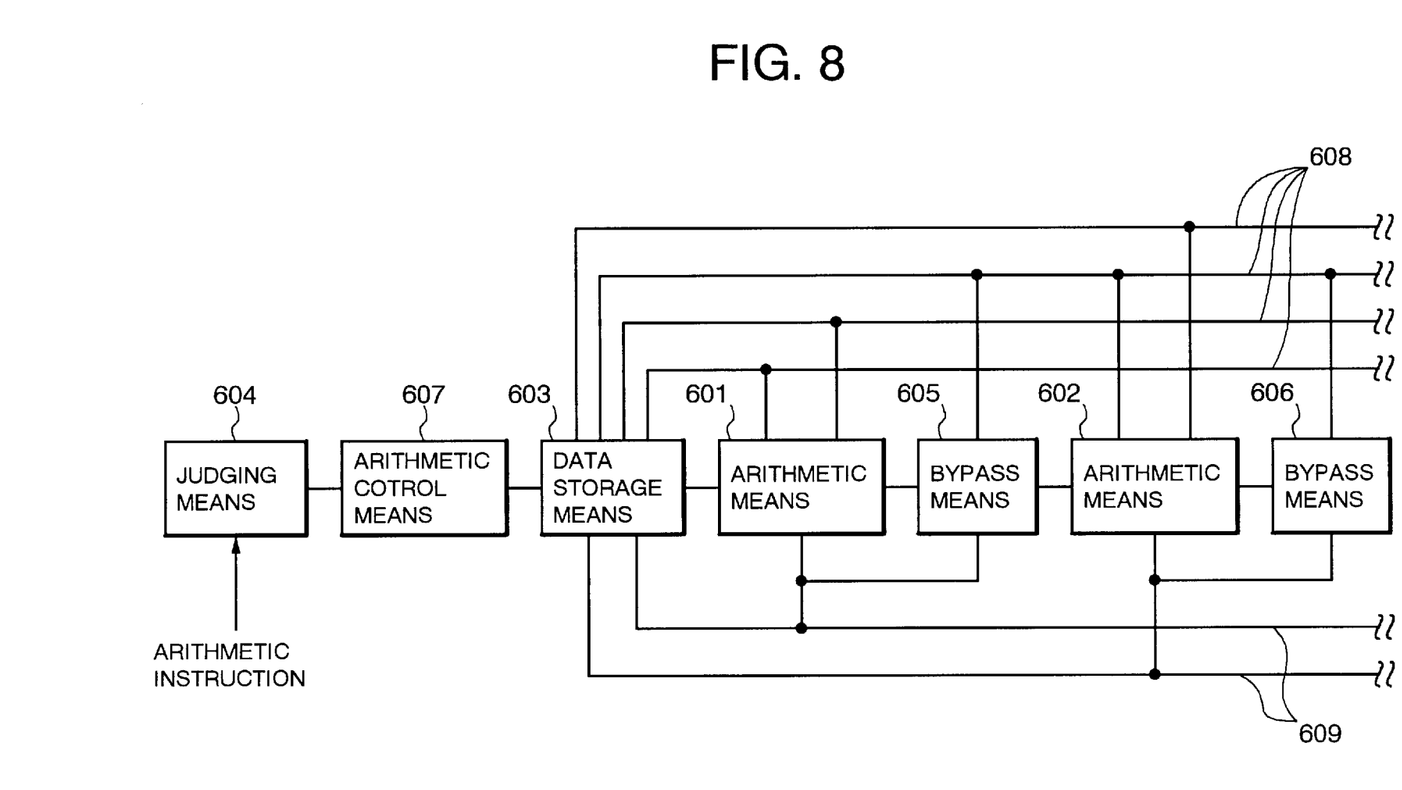
FIG. 8 is a block diagram showing a constitution of a parallel arithmetic processing unit as a third example.

Hereinafter, a parallel arithmetic processing unit disclosed in the Japanese Unexamined Patent Publication (Kokai) No. Heisei 5-88893 will be briefly described as a third example of the prior art with reference to FIG. 8.

The parallel arithmetic processing unit comprises arithmetic means 601 and 602, a data storage means 603, a judging means 604, bypass means 605 and 606, and an arithmetic control means 607.

When there is dependency between arithmetic instructions, the arithmetic control means 607 selects an arithmetic means 601 for executing a depended arithmetic instruction and an arithmetic means 602 for executing a depending arithmetic instruction according to the judgment by the judging means 604, and outputs the input data corresponding to the respective arithmetic means 601 and 602 from the data storage means 603. Simultaneously, the output data in the arithmetic means 601 executing the depended arithmetic instruction is directly output from the data storage means 603 through the bypass means 605 as an input data for the arithmetic means 602 executing a depending arithmetic instruction, thereby to prevent the data hazard. When there is no dependency between the arithmetic instructions, the arithmetic control means 607 selects the arithmetic means 601 or 602 corresponding to each arithmetic instruction, and outputs the input data corresponding to the arithmetic means 601 or 602 from the data storage means 603.

When the arithmetic means 601 or 602 is a shifter 414 as indicated in FIG. 6 of the first example, a structure hazard occurs due to queuing of the third operand because there is no means to provide three input operands at a time as designated by the three operand instruction.

When a register file holding the data necessary for the internal arithmetic processing of a machine instruction has two read ports as explained in the 32 bits microprocessor of the first example, a machine instruction requiring two or less input operands could be executed efficiently, without disturbing the pipeline control. However, a machine instruction requiring three input operands demands extra time for preparing the third operand, causing a structure hazard such as to disturb the pipeline control, which results in deteriorating the instruction throughput of the microprocessor. The like problem occurs in the parallel arithmetic processing unit of the third example.

When a register file holding the data necessary for the internal arithmetic processing of a machine instruction has three read ports as explained in the 32 bits microprocessor of the second example, a machine instruction requiring three input operands causes no structure hazard such as to disturb the pipeline control because of the capability to provide three operands at a time. However, a register file having three read ports needs a register file chip area about one and a half times larger than a register file having two read ports. This results in increasing the chip area of the microprocessor and decreasing the yielding per a semiconductor wafer.

In the case that one read port is provided in the register file, because the number of a transistor increases with 2 pcs per one bit, the number of transistors needed for a general register files having the structure of 32 bits×32 registers increases with 2048 pcs.

A logical circuit is also necessary for controlling the read port of a register file. More transistors demands more power consumption, and an expensive package for sealing such a microprocessor is also necessitated, which results in raising the price of the microprocessor products. Increase in power consumption is not preferable considering the recent market tendency toward less consumption. Increase in price and power consumption will deteriorate competitive power in the market.

SUMMARY OF THE INVENTION

The first object of the present invention is to restrain the disturbance in a pipeline control so as to improve the instruction throughput in a microprocessor with a register file having a minimum of read ports.

The second object of the present invention is to provide a microprocessor with the minimum read port in a register file, capable of executing an arithmetic instruction requiring input operands more than the number of operands a register file can simultaneously provide with at a time, without disturbing a pipeline control by a structure hazard.

The third object of the present invention is to provide a microprocessor capable of preventing an increase in chip area as well as an increase in power consumption and price, by restraining the number of the read ports in the register file to as few as possible.

According to one aspect of the invention, a microprocessor by a pipeline control method with the process of a machine instruction divided into several stages for performing the parallel processing in each stage, comprising;

an arithmetic means for performing an arithmetic and logic operation to the data of the operand designated by a machine instruction, a register file means for holding the data necessary for the internal processing of a machine instruction and providing said arithmetic means with the data, a plurality of timing register means for temporally holding the data parallel processed in the respective stages, and a short pass means for selecting operands said register file means can't provide with at a time from the output of said arithmetic means and simultaneously providing said arithmetic means with the data of the operands at the same time as the other operands, when the number of the input operands necessary for the operation designated by said machine instruction is m or e than the number of the operands said register file means can provide with at a time.

In the preferred construction, the pass means selects operands said register file means can't provided with at a time from the output of said arithmetic means or from the output of said timing register means of holding the operation results by said arithmetic means, and simultaneously provides said timing register means of holding the input data for said arithmetic means with the data of the operands.

In the preferred construction, the short pass means is connected between the output of said arithmetic means as well as said timing register means of holding the operation result by said arithmetic means and said timing register means of holding the input data for said arithmetic means.

In another preferred construction, the pass means is constituted by a selector connected between the output of said arithmetic means as well as said timing registers of holding the operation result by said arithmetic means and said timing register means of holding the input data for said arithmetic means.

In another preferred construction, the microprocessor further comprises a plurality of said arithmetic means for performing various arithmetic and logic operations, and a plurality of said timing register means for holding the respective operation results by a plurality of said arithmetic means, wherein the short pass means is connected between the output of a plurality of said arithmetic means as well as a plurality of said timing register means of holding the operation results by said arithmetic means and said timing register means of holding the input data for a plurality of said arithmetic means, and the short pass means selects operands said register file means can't provide with at a time from the output of a plurality of said arithmetic means or the output of a plurality of said timing register means on the basis of the operation designated by said machine instruction, and provides said predetermined arithmetic means with the data of the operands.

According to another aspect of the invention, a microprocessor by a pipeline control method with the process of a machine instruction divided into several stages for performing the parallel processing in each stage, comprising;

an arithmetic means for performing an arithmetic and logic operation to the data of the operand designated by a machine instruction, a register file means for holding the data necessary for the internal processing of a machine instruction and providing said arithmetic means with the data, a plurality of timing register means for temporally holding the data parallel processed in the respective stages, and a short pass means connected between the output of said arithmetic means as well as said timing register means of holding the operation result by said arithmetic means and said timing register means of holding the input data for said arithmetic means, said short pass means selecting operands said register file means can't provide with at a time from the output of said arithmetic means or from the output of said timing register means of holding the operation result by said arithmetic means and simultaneously providing said timing register means of holding the input data for said arithmetic means with the data of the operands.

In the preferred construction, the short pass means is constituted by a selector connected between the output of said arithmetic means as well as said timing registers of holding the operation result by said arithmetic means and said timing register means of holding the input data for said arithmetic means.

In another preferred construction, the microprocessor further comprises a plurality of said arithmetic means for performing various arithmetic and logic operations, and a plurality of said timing register means for holding the respective operation results by a plurality of said arithmetic means, wherein the short pass means is connected between the output of a plurality of said arithmetic means as well as a plurality of said timing register means of holding the operation results by said arithmetic means and said timing register means of holding the input data for a plurality of said arithmetic means, and the short pass means selects operands said register file means can't provide with at a time from the output of a plurality of said arithmetic means or the output of a plurality of said timing register means on the basis of the operation designated by said machine instruction, and provides said predetermined arithmetic means with the data of the operands.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings.

DESCRIPTION OF THE PREFERRED EMBODIMENT

A preferred embodiment of the present invention will be explained in detail with reference to the accompanying drawings.

Figure 1:
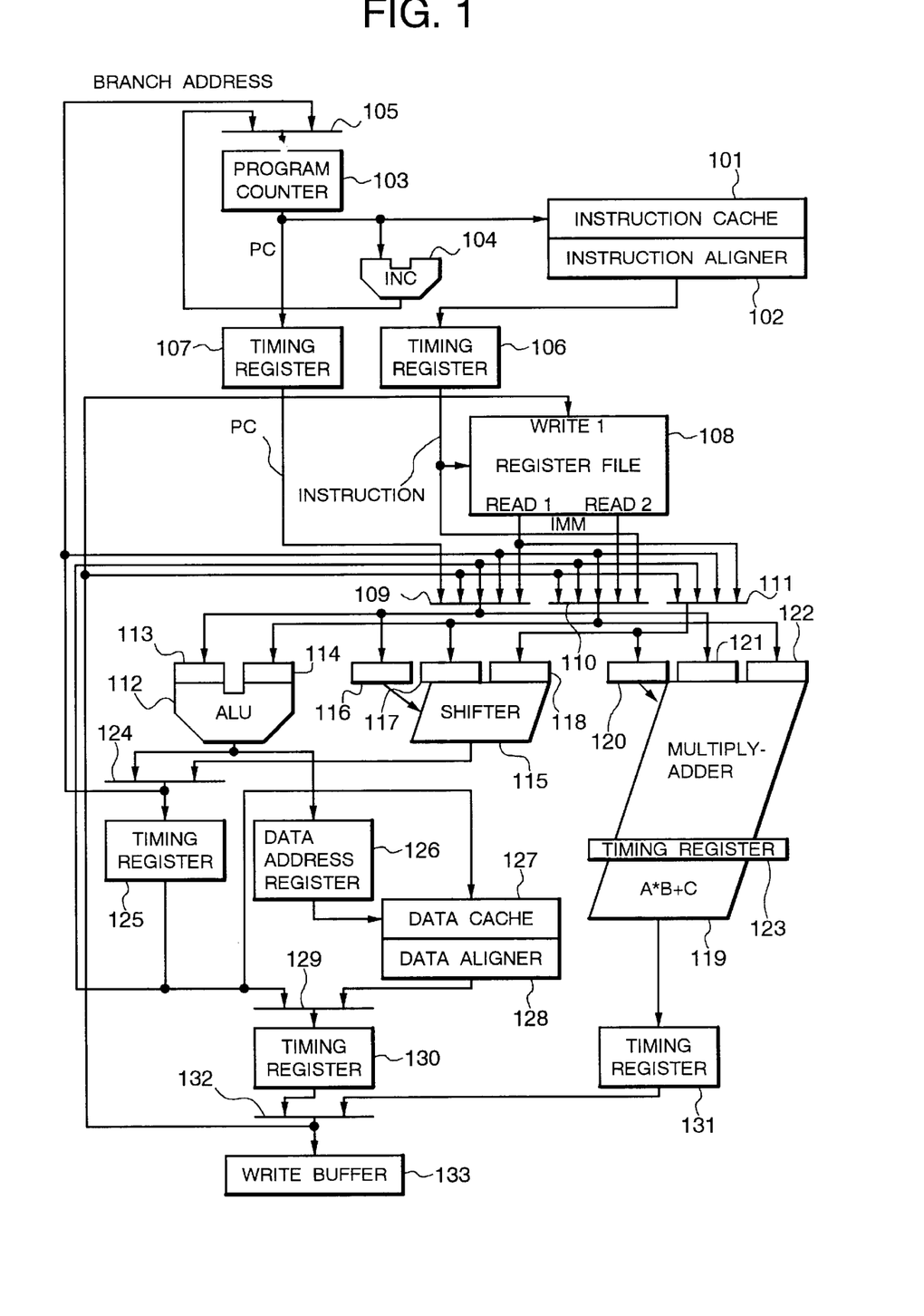
FIG. 1 is a block diagram showing a constitution of a 32 bits microprocessor of a first embodiment according to the present invention.

FIG. 1 is a block diagram showing a 32 bits microprocessor (the production name µPD705100, by way of example of a 32 bits microprocessor) of a first embodiment according to the present invention. As shown in FIG. 1, the microprocessor of this embodiment is a microprocessor using a pipeline control method, comprising a register file 108 having two read ports and holding the data necessary for the internal arithmetic processing of a machine instruction, an ALU 112, a shifter 115 and a multiply-adder 119 constituting an arithmetic circuit for executing an arithmetic and logic operation by the use of the data held in the register file 108, a plurality of timing registers 106, 107, 113, 114, 116, 117, 118, 120, 121, 122, 123, 125, 130 and 131 for holding the parallel processed data into the respective stages by dividing the process of the machine instruction into several stages, a short pass selector 111, and a write data selector 132.

The 32 bits microprocessor of the first embodiment further comprises an instruction cache 101, an instruction aligner 102, a program counter 103, an incremental counter 104, an address selector 105, bypass selectors 109 and 110, arithmetic output selectors 124 and 129, a data address register 126, a data cache 127, a data aligner 128 and a write buffer 133.

The function of each timing register is additionally explained. In the stage of IF, the timing register 106 holds a read instruction from the instruction cache 101, while the timing register 107 holds the instruction address.

In the stage of RF, the timing registers 113 and 114 hold the input data for the ALU 112, the timing registers 116, 117 and 118 hold the input data for the shifter 115, and the timing registers 120, 121 and 122 hold the input data for the multiply-adder 119.

In the stage of EX, the timing register 123 holds the intermediate data in the multiply-adder 119, and the timing register 125 holds the operation result from the ALU 112 or the shifter 115.

In the stage of DF, the timing register 130 holds the operation result from the ALU 112 or the shifter 115, or the read data from the data cache 127, and the timing register 131 holds the operation result from the multiply-adder 119.

Figure 2:
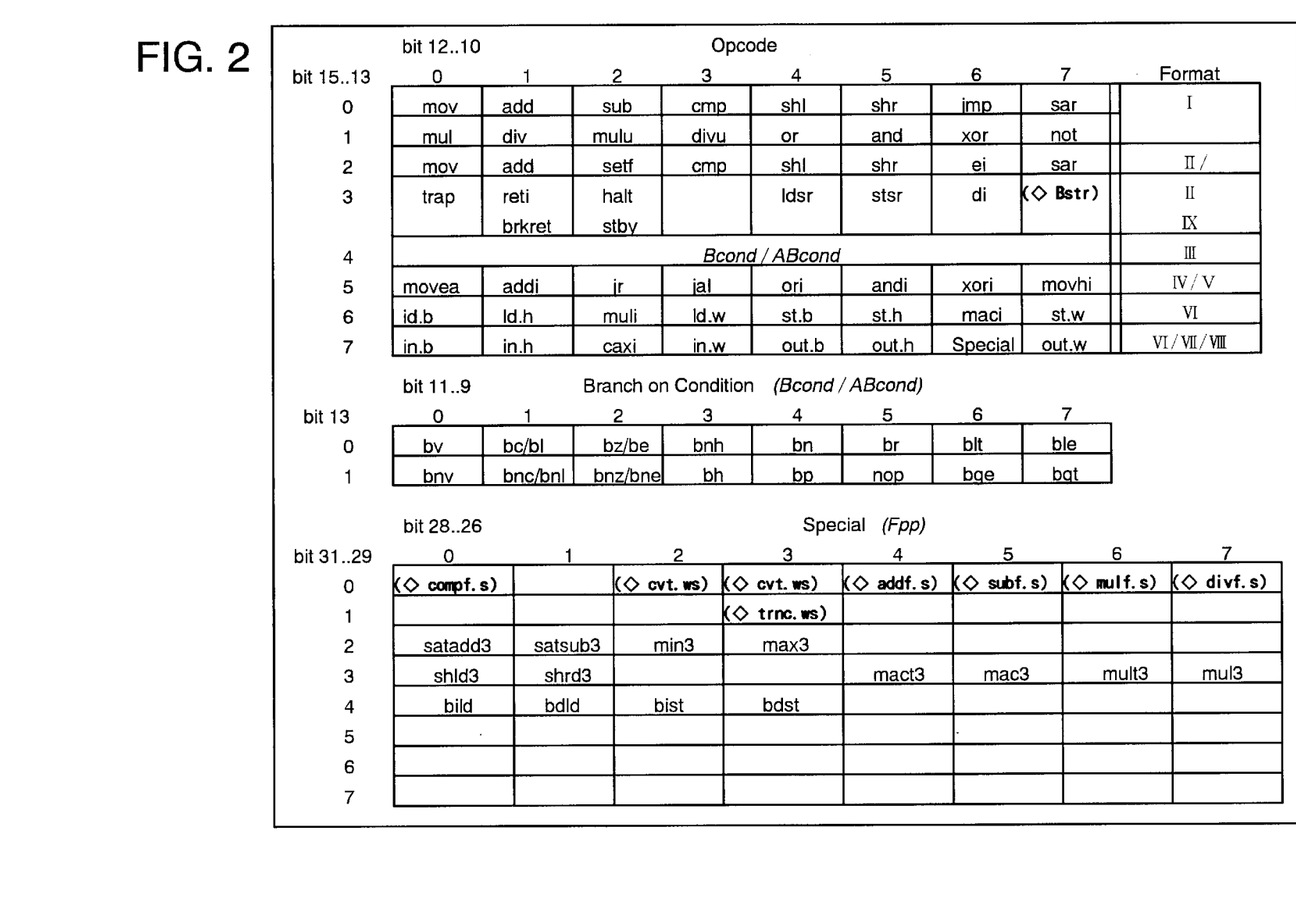
FIG. 2 is a list of instruction set for explaining RISC typed instructions executed by the pipeline control method in the 32 bits microprocessor of the first embodiment.

The 32 bits microprocessor of this embodiment is a microprocessor capable of executing RISC typed instructions by the pipeline control method. FIG. 2 is a list of instruction set showing the RISC typed instructions.

Such instructions as requiring three input operands in the machine instructions executed by the 32 bits microprocessor of this embodiment are the following four instructions; 'shld3', 'shrd3', 'mac3' and 'mact3'.

The instruction 'shld3' is a connection and left shift instruction so as to connect a second operand and a third operand, shift it to the left for the number of the shift designated by the lower 5 bits of a first operand, and store the resultant upper 32 bits into the third operand.

The instruction 'shrd3' is a connection and right shift instruction so as to connect a second operand and a third operand, shift it to the right for the number of the shift designated by the lower 5 bits of a first operand, and store the resultant upper 32 bits into the third operand.

The instruction 'mac3' is a product-sum operation instruction so as to perform multiplication of a second operand and a third operand, add the multiplication result to the first operand, and store a maximum positive value or a maximum negative value into the third operand when the result is saturated, or store the result value into the third operand when the result is not saturated.

The instruction 'mact3' is a product-sum operation instruction so as to perform multiplication of a second operand and a third operand, add the multiplication result to the first operand, and store a maximum positive value or a maximum negative value into the third operand when the result is saturated, or store the result value into the third operand when the result is not saturated.

The case of executing the following machine instruction string by the 32 bits microprocessor of this embodiment will be explained.

|  |  |  |  |  |  |
|---|---|---|---|---|---|
|  | add | r1, | r5 |  | ; addition |
|  | mac3 | r1, | r2, | r5 | ; product-sum |
| operation |  |  |  |  |  |
|  | add | r6, | r7 |  | ; addition |

Figure 4:
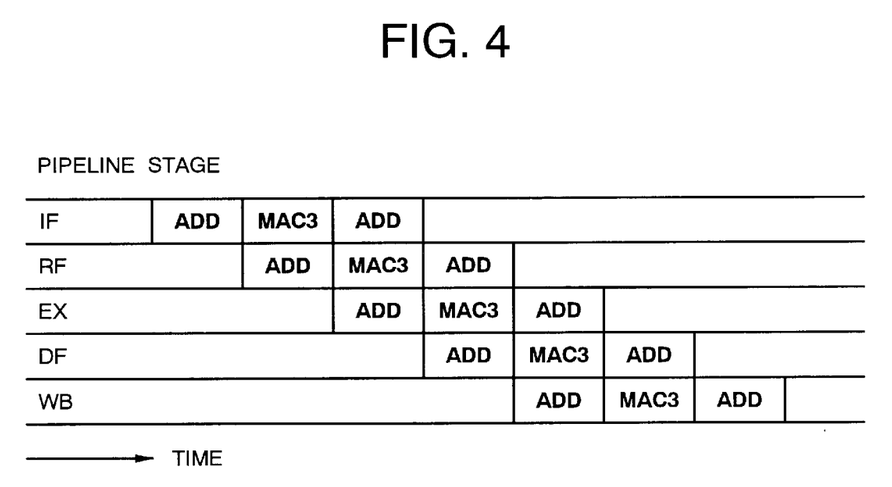
FIG. 4 is a timing chart showing the pipeline control processing of a machine instruction string by the microprocessor of the first embodiment.

FIG. 4 is a timing chart showing the movement of the microprocessor executing the above machine instruction string.

At first, the 32 bits microprocessor reads the first instruction 'add' from the instruction cache 101 through the instruction aligner 102, and holds the data in the timing register 106.

In the next cycle, the microprocessor decodes the first instruction 'add' read out therefrom, reads out the data within the register r1 and the register r5 designated as a first operand and a second operand by the instruction, from the register file 108, and holds the respective data in the timing registers 113 and 114 providing the ALU 112 with the data through the respective bypass selectors 109 and 110. Simultaneously, the second instruction 'mac3' is read out and held in the timing register 106.

In the next cycle, the ALU 112 executes the addition of the first instruction 'add' and holds the operation result in the timing register 125. Simultaneously, the microprocessor decodes the second instruction 'mac3', reads out the data within the register r1 and the register r2 designated as a first and a second operand by the instruction from the register file 108, and holds the data in the timing registers 121 and 122 providing the multiply-adder 119 with the data through the respective bypass selectors 109 and 110.

Simultaneously, the register r5 designated as a third operand by the instruction 'mac3' is prepared by holding the operation result of the first instruction 'add' in this cycle, in the timing register 120 through the short pass selector 111. At the same time, the third instruction 'add' is read out and held in the timing register 106.

In the next cycle, the operation result of the first instruction 'add' held in the timing register 125 for adjusting the timing to write the data into the register r5 is further held in the other timing register 130, and the multiply-adder 119 starts executing the product-sum operation for the second instruction 'mac3', and the intermediate data is held in the timing register 123. Simultaneously, the microprocessor decodes the third instruction 'add', reads out the data within the register r6 and the register r7 designated as the first operand and the second operand by the instruction from the register file 108, and holds the data in the respective timing registers 113 and 114 providing the ALU 112 with the data through the respective selectors 109 and 110.

In the next cycle, the operation result of the first instruction 'add' held in the timing register 130 is written into the register r5 of the register file 108. The latter half of the product-sum operation for the second instruction 'mac3' is executed, and the operation result is held in the timing register 131. At the same time, the ALU 112 executes the addition of the third instruction 'add ', and the operation result is held in the timing register 125.

As is clear from FIG. 4, the machine instruction string is executed without any time slots killed by the structure hazard. The other machine instructions of shld3, shrd3 and mact3 requiring three input operands can be executed without such killed time slots, in the 32 bits microprocessor V830 of this embodiment.

Figure 3:
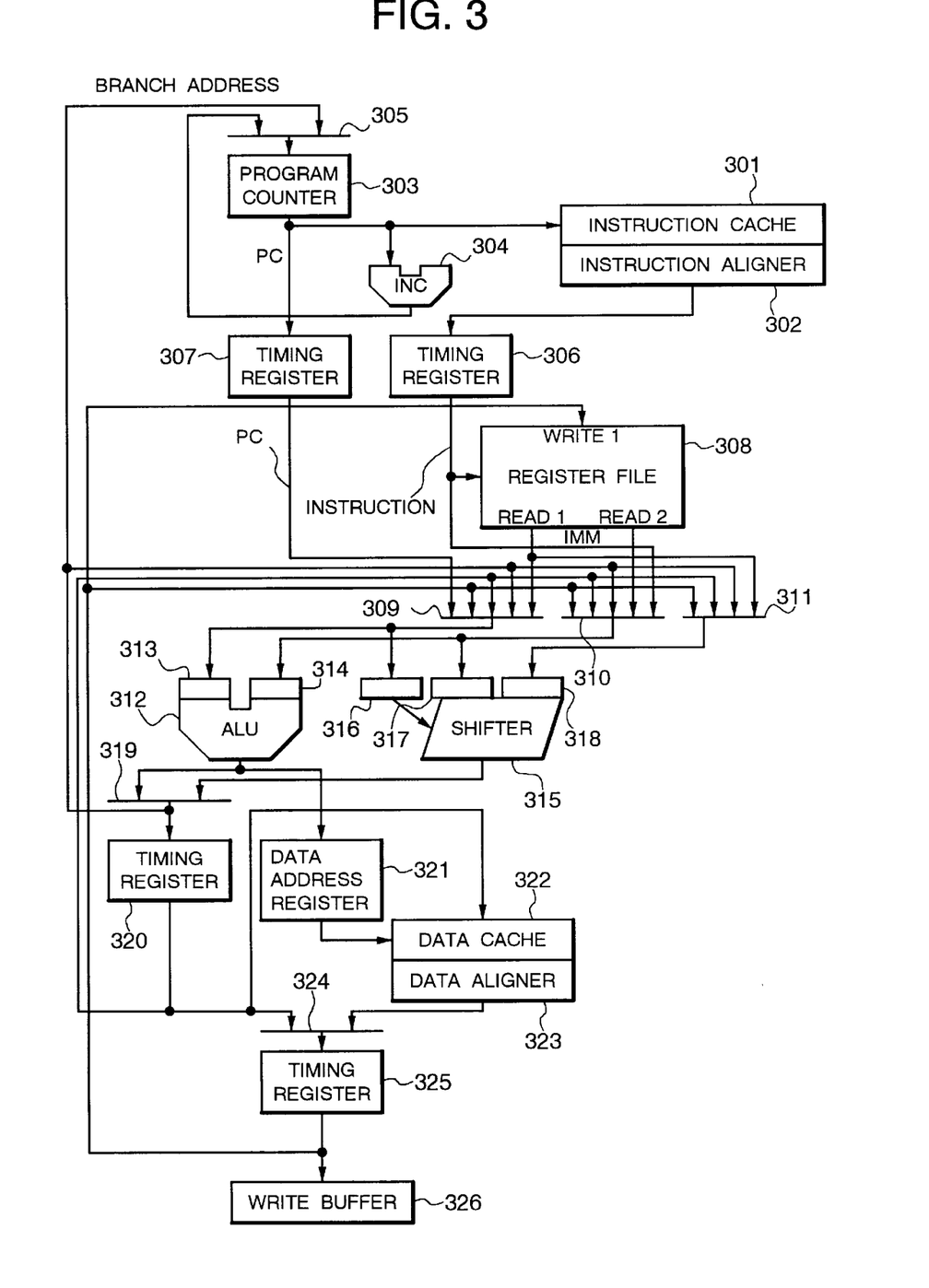
FIG. 3 is a block diagram showing a constitution of a microprocessor of the first embodiment according to the present invention.

FIG. 3 is a block diagram showing the second embodiment of a microprocessor according to the present invention. The microprocessor of the second embodiment is a 32 bits microprocessor more general than that of the first embodiment shown in FIG. 1, because of having no multiply-adder. The structure and data flow other than the multiply-adder 119 is the same as the first embodiment. Namely, the microprocessor of the second embodiment is a microprocessor operating by the pipeline control method, comprising a register file 308 having two read ports and holding the data necessary for the internal arithmetic processing of a machine instruction, an ALU 312 and a shifter 115 constituting an arithmetic circuit for performing an arithmetic and logic operation by the us e of the data held in this register file 308, a plurality of timing registers 306, 307, 313, 314, 316, 317, 318, 320, 321 and 325 for holding the parallel processed data in the respective stages by dividing the process of the machine instruction into several stages, and a short pass selector 311.

The microprocessor of the second embodiment further comprises an instruction cache 301, an instruction aligner 302, a program counter 303, an incremental counter 304, an address selector 305, bypass selectors 309 and 310, arithmetic output selectors 319 and 324, a data address register 321, a data cache 322, a data aligner 323 and a write buffer 326.

This time, the case will be explained where the machine instruction string used in the first example of the prior art is executed by the microprocessor of the second embodiment.

```
xor     r1,   r4          ; exclusive OR
shld3   r2,   r3,   r4    ; connection and left shift
add     r6,   r7          ; addition
```

Figure 5:
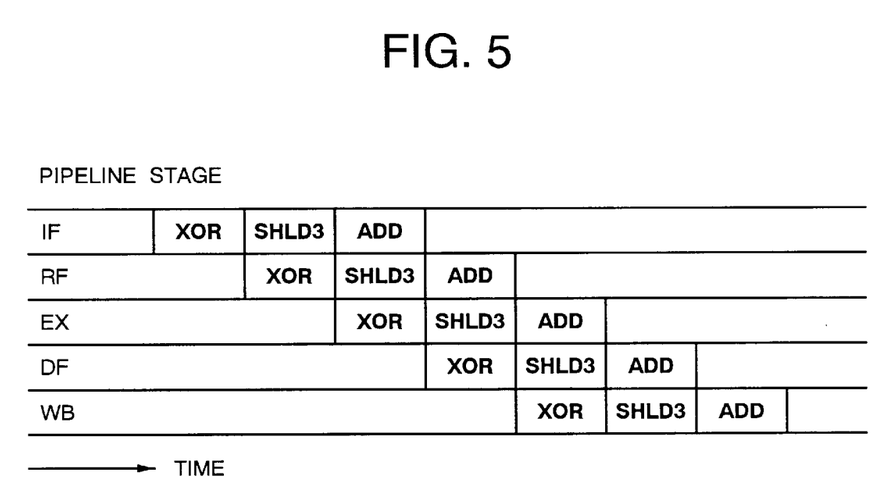
FIG. 5 is a timing chart showing the pipeline control processing of a machine instruction string by the microprocessor of the second embodiment.

FIG. 5 is a timing chart showing the movement of the microprocessor executing the above machine instruction string.

At first, the microprocessor reads the first instruction 'xor' from the instruction cache 301 through the instruction aligner 302, and holds the data in the timing register 306.

In the next cycle, the microprocessor decodes the first instruction 'xor' read out therefrom, reads out the data within the registers r1 and the register r4 designated as a first operand and a second operand by the instruction from the register file 308, and holds the data in the respective timing registers 313 and 314 providing the ALU 312 with the data, through the respective bypass selectors 309 and 310. Simultaneously, the second instruction 'shld3' is read out and held in the timing register 306.

In the next cycle, the ALU 311 executes the exclusive OR of the first instruction 'xor', and the operation result is held in the timing register 320. At the same time, decoding the second instruction 'shld3', the microprocessor reads out the data within the register r2 and the register r3 designated as a first operand and a second operand by the instruction from the register file 308 and holds the data in the respective timing registers 316 and 317 providing the shifter 315 with the data, through the respective bypass selectors 309 and 310.

At this time, the register r4 designated as a third operand by the instruction 'shld3' is prepared by holding the arithmetic result of the first instruction 'xor' in this cycle, in the timing register 318 through the short pass selector 311. This makes the register r4 designated as a third operand by the instruction 'shld3' always prepared in this cycle even if only two sets of read ports in the register file and bypass selectors are provided like the first example of the prior art. Simultaneously, the third instruction 'add' is read out and held in the timing register 306 in this cycle.

In the next cycle, the operation result of the first instruction 'xor' held in the timing register 320 for adjusting the timing to write the data in the register r5 is further held in the other timing register 325, and the operation of the second instruction 'shld3' is executed and the operation result is held in the timing register 320. Further, the third instruction 'add' is decoded, the data within the registers r6 and r7 designated as a first and a second operand by the instruction are read out from the register file 308, and held in the respective timing registers 313 and 314 providing the ALU 311 with the data.

As is apparent from FIG. 5, the machine instruction string can be executed without any time slot killed by the structure hazard in the pipeline control processing of the machine instruction string in each cycle as mentioned above.

In the execution of the connection and left shift arithmetic instruction 'shld3', that is the second instruction using three operands, the third operand can be prepared at the same time as the other operands, thereby preventing the delay in the operation.

The microprocessor of the second embodiment is incapable of executing the product-sum operation instructions 'mac3' and 'mact3' which can be executed by the microprocessor of the first embodiment. While, it can execute the machine instructions 'shld3' and 'shrd3' requiring three input operands, without any killed time slot, similarly to the first embodiment.

Thought a 32 bits microprocessor is used in the first and the second embodiment, the present invention can be applied to a microprocessor having any other bus width than that of 32 bits. Though two read ports are used in the register file in the both embodiments, the present invention can be used in the case where the number of read ports is other than two. The present invention can be used, not to mention, in the case of executing a machine instruction requiring more than three input operands by a microprocessor having three read ports for example.

Machine instructions requiring more than three input operands are as follows.

pack_word r1, r2, r3, r4

This instruction is to connect the byte data stored in the four registers, and store it into the register r4 as one word data.

max r1, r2, r3, r4

This instruction is to store the maximum value of the data stored in the four registers, into the register r4.

As set forth hereinabove, the present invention is provided with a short pass circuit for detecting operands which exceed the read port capacity of the register file at a given time, and provided data from the output held in a plurality of timing registers or from the output held in an arithmetic circuit, as well as simultaneously providing data to the timing registers which store the input data for the arithmetic circuit. Therefore, the present invention is capable of executing the arithmetic instruction requiring input operands more than the number of the operands provided at a time from the register file, with read ports as few as possible, without disturbing the pipeline control by the structure hazard.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A microprocessor system operating in a pipeline processing configuration and executing multi-stage machine instructions comprising:

a plurality of execution-logic units for processing data, at least one of said execution-logic units being an arithmetic/logic unit (ALU) for performing arithmetic and logic operations, a register file for storing data and providing said ALU with data necessary for performing said arithmetic and logic operations as specified by said machine instructions, said register file having n read ports for simultaneously supplying data to said ALU, n being a natural number, a plurality of timing registers for storing data from stages of said pipeline processing, at least one of said multi-stage machine instructions designating n+m operands where m is a natural number which is greater than zero, n bypass selectors connected to respective n read ports of said register file, said bypass selectors connected to provide data to said execution-logic units of said microprocessing system including said ALU, and a short pass selector means having at least m inputs and connected to an output of at least one of said timing registers, for feeding data stored in said at least one timing register to at least one of said execution units, other than said ALU, simultaneously with data being fed to said ALU by at least some of said n bypass selectors.

2. A microprocessor system as recited in claim 1, wherein said execution logic units include a shifter.

3. A microprocessor system as recited in claim 1, wherein said execution logic units include a multiply-adder.

4. A microprocessor system as recited in claim 1, wherein said short pass selector means operates to feed data stored in said at least one timing register to at least one of said execution units, other than said ALU, simultaneously with data being fed to said ALU by said n bypass selectors.

5. A microprocessor system as recited in claim 4, wherein said ALU has n input ports connected to receive data from said n bypass selectors, each bypass selector feeding a separate port of said ALU.

6. A microprocessor system as recited in claim 1, wherein said short pass selector means operates to feed data stored in said at least one timing register to at least one of said execution units simultaneously with data being fed to others of said execution units by said n bypass selectors.

7. A microprocessor system as recited in claim 1, wherein said short pass selector means operates to feed data stored in said at least one timing register to at least one of said execution units simultaneously with data being fed to at least some of said other execution units by said n bypass selectors.

8. A microprocessor system as recited in claim 1, wherein said plurality of execution-logic units, includes a plurality of arithmetic logic units.

* * * * *